3,543,574
METHODS AND APPARATUS FOR DETECTING VARIATIONS IN GROSS MOMENTUM THRUSTS
Carroll E. Johnson, 1905 Sevilla Road, Fort Worth, Tex. 76116
Continuation-in-part of application Ser. No. 489,530, Sept. 23, 1965. This application Nov. 1, 1968, Ser. No. 814,860
Int. Cl. G01m 15/00
U.S. Cl. 73—117.4   16 Claims

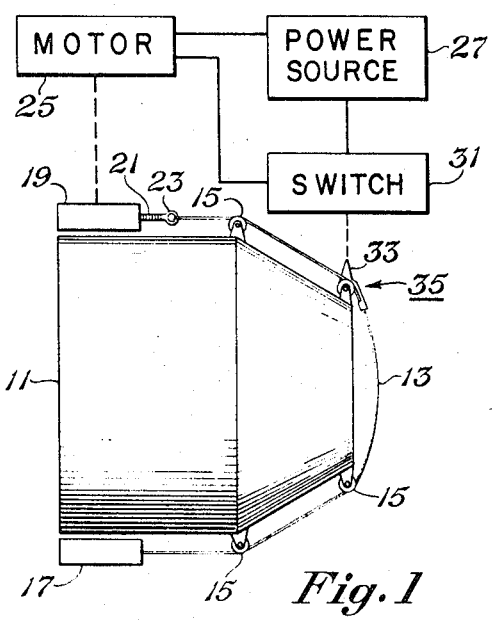
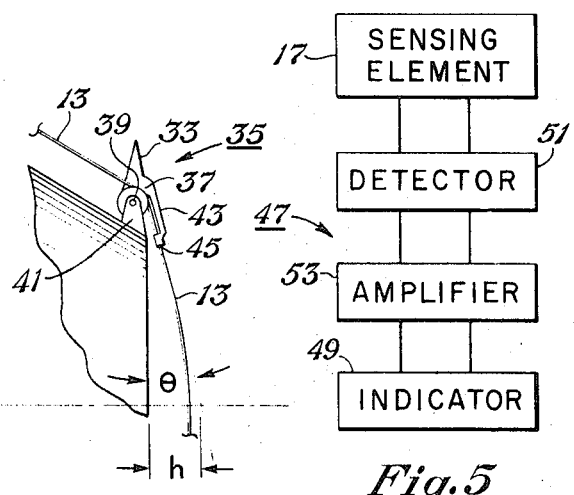
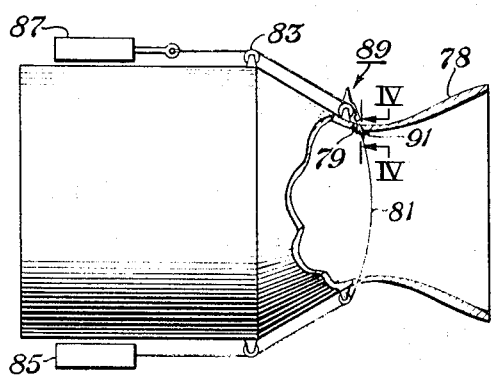
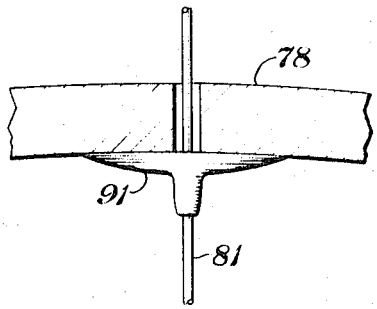
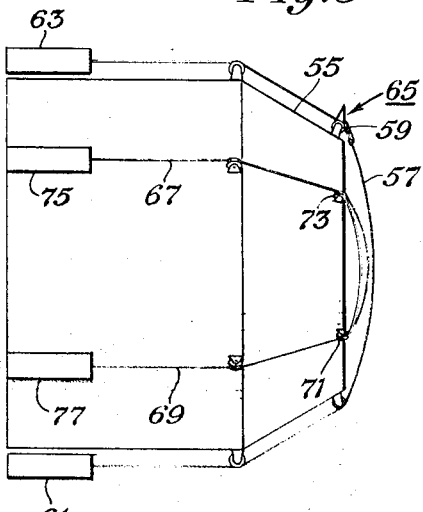
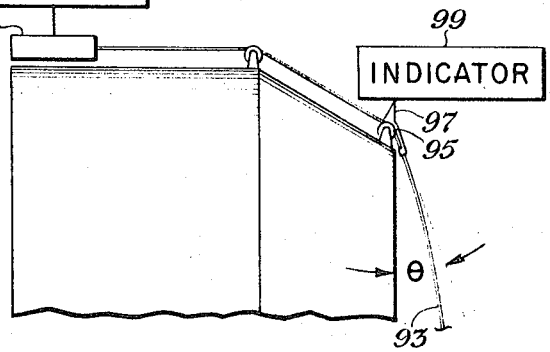

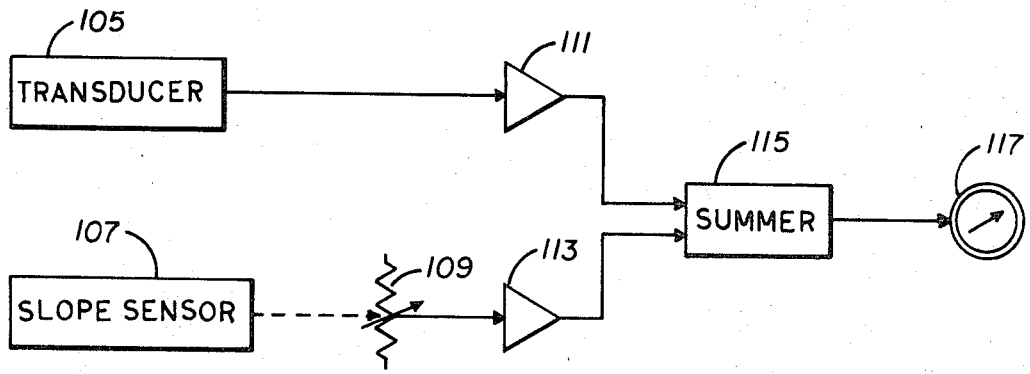
FIG. 7-A
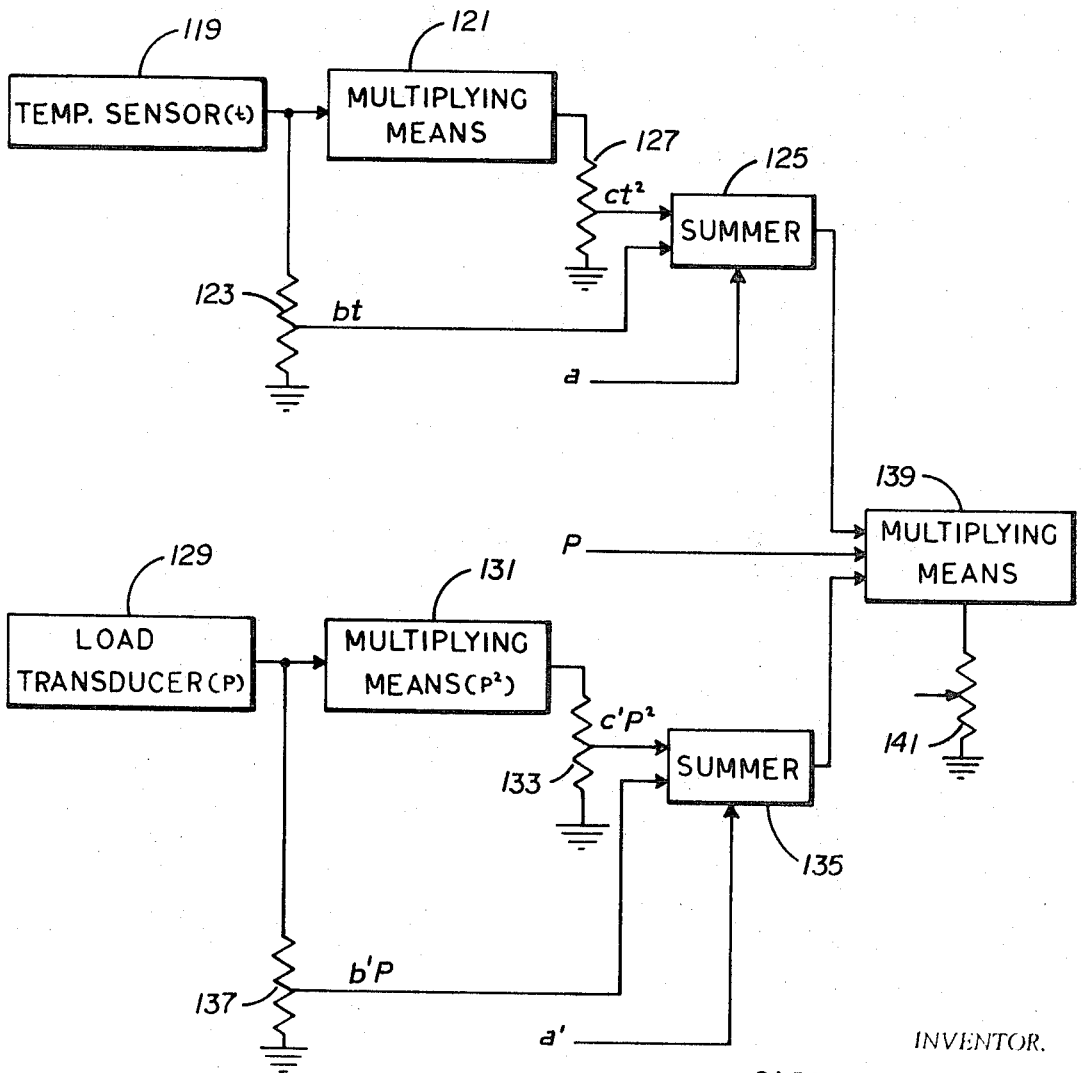
FIG. 8
INVENTOR.
CARROLL E. JOHNSON
BY
Wofford & Felsman
ATTORNEYS

United States Patent Office 3,543,574
Patented Dec. 1, 1970

ABSTRACT OF THE DISCLOSURE

Methods and apparatus for detecting variations in gross momentum thrusts of momentum thrust engines by positioning a wire across the vena contracta of the exhaust flow of a convergent or convergent-divergent nozzle and measuring the variations in tensile loading of the wire. For minimum inaccuracy, the angle the wire makes with the supports is physically maintained constant, or computed to a predetermined value with an analogue computer.

CROSS REFERENCE TO RELATED APPLICATION

This application is a continuation-in-part of a previous application of the same title, Ser. No. 489,530, filed Sept. 23, 1965 and now abandoned.

My invention relates in general to methods and apparatus for measuring the thrusts developed by momentum thrust engines (e.g., jet or rocket engines) and in particular to means for detecting variations in the gross momentum thrusts developed by such engines.

For the past fifteen years extensive efforts have been made to develop satisfactory means for measuring the inflight thrusts of jet engines. Presently available means for measuring inflight jet engine thrusts have not proved to be practicable.

Yet the need for satisfactory means to measure inflight jet engine thrusts has been apparent for years. The advantages which would derive from knowing the thrusts developed by inflight, momentum thrust engines are many. In multi-engine jet aircraft, for example, pilots could more easily equalize the thrusts developed by the respective engines if such means were available. Moreover, any decrease during flight from preselected thrusts would become readily apparent if, for example, there were thrust indicating instruments in the cockpit. In addition, knowledge of inflight thrust levels of jet engines would be beneficial for the purpose of maximizing the range of aircraft.

Variations in the net thrusts developed by momentum thrust engines, such as jet engines, may be determined by computing the gross momentum thrust developed by the engine and by then computing and subtracting the gross momentum drag forces. It has been known for some time now how to determine the gross momentum drag forces of jet engines on the ground or in flight. My invention is directed to the problem of determining variations in the gross momentum thrusts developed by momentum thrust engines. The net thrusts may then be conveniently determined once the gross momentum thrusts are known.

It is accordingly, the general object of my invention to provide improved methods and apparatus for detecting variations in the gross momentum thrusts developed by momentum thrust engines.

Another object of my invention is to provide improved methods for detecting variations in the gross momentum thrusts developed by momentum thrust engines, said methods being applicable in flight in a manner that does not significantly decrease engine thrusts.

Another object of my invention is to provide improved apparatus for measuring the thrusts of momentum thrust engines, such apparatus having simplicity and compactness whereby insignificant amounts of thrusts are sacrificed and yet accuracy and reliability may be achieved.

These and other objects are effected by my invention as will be apparent from the following description, taken in accordance with the accompanying drawings, in which:

FIG. 1 is a schematic side elevational view that shows the exit region of a convergent nozzle of a momentum thrust engine and apparatus assembled therewith for detecting variations in gross momentum thrusts in accordance with the principles of my invention;

FIG. 2 is a fragmentary side elevational view of a device for indicating variations in the angle $\theta$ that a wire makes with the supports that position the wire transversely across a nozzle;

FIG. 3 is a schematic side elevational view in fragmentary section of a convergent-divergent nozzle having apparatus assembled therewith for detecting variations in gross momentum thrusts;

FIG. 4 is a schematic and fragmentary end view of a portion of the apparatus of FIG. 3;

FIG. 5 is a schematic diagram showing apparatus for transmitting sensed variations in the tensile load of a wire to a suitable indicator that may be located in a cockpit, for example, to indicate variations in the gross momentum thrusts developed by a momentum thrust engine;

FIG. 6 is a schematic side elevational view of the exit region of a convergent nozzle having apparatus assembled therewith in modified form for detecting variations in gross momentum thrusts;

FIG. 7 is a schematic side elevational view of an alternate form of my invention;

FIG. 7–A is a schematic circuit for determining gross momentum thrust once the slope of the wire adjacent its supports and the tensile loading are determined; and FIG. 8 is a schematic diagram of an analogue computer used to compute the angle the wire makes with its supports to an equivalent constant angle in an embodiment in which the angle is not physically maintained constant.

My invention may be broadly described as means for detecting variations in gross momentum thrusts, such means encompassing the use of a wire stretched transversely across the vena contracta of the nozzle of a momentum thrust engine so that variations in the tensile loading of the wire may be sensed. I will demonstrate analytically that detected variations in the tensile loading of the wire or in the tensile loading and the slope of the wire adjacent its mounting means, may be used to accurately reflect variations in gross momentum thrusts.

As will be explained in detail hereinafter, there are only three seemingly troublesome variable parameters which affect the tensile loading of the above wire. These variable parameters are: (1) the dynamic loading on the wire, which is a function of the dynamic pressure $q$ exerted upon the wire by the gas flowing through the nozzle; (2) the drag coefficient $C_d$ of the wire; and (3) the slope or angle $\theta$ of the wire as measured adjacent its support points.

Of the above variable parameters, the drag coefficient $C_d$ of the wire is a function of the Mach number. The Mach number at or near the vena contracta of a jet engine nozzle, for example, is very close to unity and remains constant at all thrust levels when the engine operates in the choked condition (as jet engines nearly always do). Therefore, by stretching the wire diametrically across the nozzle throat as close as practicable to the vena contracta, the drag coefficient $C_d$ of the wire remains essentially constant, thus simplifying the determination of gross momentum thrusts.

The slope of the wire adjacent its supports may be maintained at a constant value by means which will be explained in the following detailed description so that this parameter thereafter remains constant.

In one form of my invention, therefore, the only variable parameter which affects tensile wire loading is the dynamic pressure $q$ exerted upon the wire by the gas flowing through the nozzle. The wire is positioned in the region of the vena contracta and its slope maintained constant. The tensile loading of the wire then becomes directly proportional to the dynamic pressure $q$, and hence variations in gross momentum thrusts may be detected by sensing the variations in the tensile loading of the wire.

In another form of my invention variations in gross momentum thrusts are detected by sensing variations in the tensile loading of the wire positioned in the region of the vena contracta and in the slope of the wire as measured adjacent its support means. The gross momentum thrust may then be computed by suitable means such as an analogue computer.

In another form of my invention variations in gross momentum thrust are detected by positioning a wire in the vena contracta region of the exhaust gases and sensing changes in the tensile loading of the wire. The slope of the wire adjacent its supports is computed to a predetermined value by suitable means such as an analogue computer. Then a value proportional to gross momentum thrust is computed by combining an analogue of the sensed tensile loading and an analogue of the slope.

In instances where the changes in the slope of the wire adjacent its supports are small, as they are over a surprisingly large range of throttle settings in a jet engine, relatively accurate detections in the variation of gross momentum thrust are obtained by sensing only the changes in the tensile loading of the wire if positioned in the vena contracta region of the exhaust gases.

The sensed changes in the tensile loading, or in the tensile loading and sensed or computed slope of the wire, may be transmitted to instruments which are calibrated in terms of gross momentum thrusts, or compared with calibration data obtained during ground testing. Such instruments may be located in the cockpit so that pilots may observe any variations in gross momentum thrusts. Since with present technology gross momentum drag forces may be determined, pilots may conveniently be apprised of the net thrusts developed by each engine.

Referring initially to FIG. 1 of the drawing, the numeral 11 designates a convergent nozzle of a jet propelled aircraft. Positioned transversely across the exit region of nozzle 11 is a wire 13, which is secured to the nozzle by mounting means which in this instance includes a plurality of pulleys 15. One end of the wire is secured to a sensing element 17, which preferably contains a transducer of the strain gage-type secured to the nozzle exterior. The purpose of sensing element 17 is to detect variations in the tensile loading of wire 13. The tensile loading of wire 13 is directly proportional to the stress or strain of the wire. Variations in the tensile loading of the wire are reflected by the strain gage and may be detected by measuring variations in the voltage drop across the strain gage, which is made a component of an electrical circuit.

The opposite end of the wire 13 of FIG. 1 is connected with wire adjustment means 19. This particular wire adjustment means includes a screw jack, which has an axially extending screw 21 with an eye 23 formed on its protruding end to which the wire 13 is attached. Screw 21 is rigidly connected with a worm gear (not shown) that is engaged by a pinion (not shown) driven by electric motor 25. The electric motor 25 is connected with a source of electrical power 27 (such as a battery) to a switch means 31. The switch means 31 may be a microswitch that is adapted to be engaged by an arm 33, the position of which depends upon the slope or angle $\theta$ (see FIG. 2) of the wire 13 as measured adjacent its support means, or in other words, near the pulleys 15 that are located at the trailing edge of the nozzle of FIG. 1.

Referring now to FIG. 2, the arm 33 (which is one element of a slope sensing means 35) may be seen as extending from a body 37 which is supported by shaft 39 and thus by support posts 41. Body 37 has a second arm 43 that has apertures 45 therein through which is inserted the wire 13. Wire 13 and the apertures 45 are sized such that they are in contact to accurately reflect any changes in the slope of wire 13.

Switch means 31 is in this instance a three position switch such that when the arm 33 of the slope sensing means 35 is in its predetermined neutral position, the associated electrical circuit is open. Electric motor 25 is therefore not energized and thus the wire adjustment means 19 is inactive. If angle $\theta$ increases, for example, arm 33 of slope sensing means 35 will be rotated in the counterclockwise direction as viewed in FIGS. 1 and 2. Since arm 33 is connected with switch means 31, the clockwise rotation of the arm actuates the switch means such that electric motor 25 and its pinion engage the worm gear (not shown) inside wire adjustment means 19 to retract screw 21. Therefore, angle $\theta$ is decreased toward its predetermined neutral position. On the other hand, if angle $\theta$ should decrease, the arm 33 of slope sensing means 35 will rotate in the clockwise direction as seen in FIGS. 1 and 2. This actuates switch means 31 such that electric motor 25 and its pinion rotate the worm gear (not shown) inside adjustment means 19 in a direction to extend the screw 21 and thereby increase angle $\theta$ toward its predetermined neutral position.

Hence, the slope of wire 13 can be maintained at a predetermined value. This particular arrangement has advantages, since a simple three position switch is all that is required. The friction in the mechanical components of the motor 25 and the wire adjustment means 19 are sufficient to prevent the wire adjustment means from hunting in response to the motions imparted to wire 13. This will prevent unwanted variations from appearing in the indicator means which are used to show variations in gross momentum thrusts.

As was explained briefly before and as will be explained in greater detail hereinafter, variations in the tensile loading of the wire 13 may be made directly proportional to the variations in the gross momentum thrusts developed by the engine. In such instance, the only variable which affects the tensile loading on the wire is the dynamic pressure $q$ exerted on the wire by the flow of exhaust gases coming from the nozzle 11. This is true so long as the angle $\theta$ or the slope of wire 13 is kept at a constant value and so long as the drag coefficient $C_d$ of the wire is maintained at a constant value. The drag coefficient $C_d$ is kept constant by positioning the wire diametrically across the nozzle at or near the vena contracta of the flowing gases. If the position of the wire does not change radically (and there are actually only very slight changes in the position of the wire due to the changing slope) then the drag coefficient $C_d$ of the wire will not change appreciably.

Referring now to FIG. 5, the sensing element 17 that detects variation in the tensile loading of the wire 13 is connected with instrumentation means 47 which transmit the sensed variation in the loading of the wire to an indicator 49 inside the cockpit of the aircraft. In instances where the sensing element 17 is a strain gage, a voltage is applied across a small circuit of which the strain gage is a part and a detector 51 which indicates variations in voltage is connected in the circuit across the strain gage to indicate the voltage drop thereacross. There are a number of methods for detecting small changes in voltage and these methods are known to those with average skill in the art. Since there are only small changes in voltages, a suitable amplifier 53 is preferably connected with the detector 51 and thus the indicator 49 receives amplified electrical signals. The indicator 49 thus need be no more complex than a voltmeter which is calibrated in terms of gross momentum thrusts.

From the above description it may be seen that variations in gross momentum thrusts may be accurately detected in a momentum thrust engine such as a jet or rocket engine, by a method which includes the steps of: (a) positioning a wire by means of suitable support members to lie transversely across the gases flowing from the nozzle; (b) sensing changes in the slope of the wire as measured adjacent at least one of said support members; (c) adjusting the tension of the wire in response to the sensed changes in the slope of the wire to reestablish and maintain said slope at a constant value; and (d) sensing variations in the tensile loading of the wire.

The slope of wire 13 above changes in response to variations in the power setting of the engine. In other words, as the gross momentum thrust of the engine changes, the slope of the wire 13 changes. In applications where there are no changes in the power setting of the momentum thrust engine, the wire adjustment means 19 and the slope sensing means 35 are not required. Most present day rocket engines, for example, only develop a single quantity of thrust. Therefore, the slope of the wire will not be expected to vary from its predetermined value. A wire 13 may be stretched transversely across the vena contracta of the flow of exhaust gases with one end secured to the nozzle and the other end secured to the sensing element. Any variation from the predetermined thrust developed by the engine will be detected by the sensing element and may be transmitted by suitable instrumentation means to an indicator that is calibrated in terms of gross momentum thrusts.

Hence, if there are to be no variations in the power setting of a momentum thrust engine, the method for determining variations in the gross momentum thrust developed by the engine simplifies to the following: (a) positioning a wire transversely across the vena contracta of the exhaust gas flowing from the nozzle of the engine; and (b) sensing variations of the tensile loading of the wire.

To understand fully how the above described methods and apparatus can be used to determine variations in gross momentum thrusts, an examination of the following analytical analysis should be made.

The net thrust equation of a convergent nozzle of a jet engine is defined analytically as:

$$F_N = \frac{W}{g} V_J + (P_N - P_{amb}) A_N - \frac{W}{g} V_o \quad (1)$$

Where:
$F_N$=net thrust developed by the engine;
$W/g$=mass flow rate through the engine;
$V_J$=velocity of the gas at the narrowest restriction or throat of the nozzle;
$V_o$=flight velocity of the aircraft;
$A_N$=nozzle area at its minimum restriction;
$P_N$=pressure of the gas at the minimum restriction or throat of the nozzle;
$P_{amb}$=ambient pressure.

$$F_N = \left[\frac{W}{g} V_J + P_N A_N\right] - \left[P_{amb} A_N + \frac{W}{g} V_o\right] \quad (2)$$

Where the term $$\left[\frac{W}{g} V_J + P_N A_N\right]$$

is the "gross momentum thrust" $F_{mv}$ developed by the engine and the term $$\left[P_{amb} A_N + \frac{W}{g} V_o\right]$$

is the "gross momentum drag" force.

As mentioned previously the parameters ($P_{amb}$) ambient pressure, ($A_N$) nozzle area, ($W/g$) mass flow of engine and ($V_o$) flight speed in the above "gross momentum drag" force term can be determined accurately for propulsion systems in flight with current technology. Thus, the "gross momentum drag" term will be deleted from further consideration.

The measurement of the remaining term, "gross momentum thrust"

$$\left[\frac{\dot{W}}{g} V_J + P_N A_N\right]$$

therefore becomes the significant problem in measuring the net thrust developed by a momentum thrust engine.

From the equation of continuity:

$$\dot{W} = \rho A_N V_J \quad (3)$$

Where:
$\dot{W}$=weight flow of gases through the nozzle;
$\rho$=density of the gases;
$A_N$=area through which the gases flow;
$V_J$=velocity of the gases.

By substituting the continuity Equation 3 in the momentum thrust Equation 2 and deleting the gross momentum drag term:

$$F_{mv} = \frac{\rho}{g} A_N V_J^2 + P_N A_N \quad (4)$$

The definition of dynamic pressure $q$ is:

$$q = \frac{1}{2} \frac{\rho}{g} V_J^2 \quad (5)$$

From the equation of state:

$$\rho = \frac{P_N}{RT_N} \quad (6)$$

Where:
R=the gas constant;
$T_N$=static temperature of gases at the nozzle throat.

and for choked flow the throat velocity ($V_J$) for a convergent nozzle at $M=1.0$ is defined as:

$$V_J = (\gamma g R T_N)^{1/2} \quad (7)$$

By substituting Equations 6 and 7 into Equation 5:

$$q = \frac{\gamma}{2} P_N \text{ (for M=1.0)} \quad (8)$$

Where:
$\gamma$=the ratio of specific heat;
$P_N$=the static pressure of the gases flowing through the nozzle throat.

Equating Equations 5 and 8;

$$\frac{\rho}{g} V_J^2 = \gamma P_N \quad (9)$$

Substituting Equation 9 for $$\frac{\rho}{g} V_J^2$$

in Equation 4:

$$F_{mv} = \gamma P_N A_N + P_N A_N$$
$$= P_N A_N (\gamma + 1) \quad (10)$$

Now in proving Equations 8 and 10 are proportional ($F_{mv} \alpha q$), it remains to justify only the parameters $$\frac{\gamma}{2} \alpha A_N (\gamma + 1)$$

since $P_N$ (nozzle static pressure) is common to both equations. It follows that for the "gross momentum thrust" $F_{mv}$ and "dynamic pressure" $q$ to exist in proportional relationship, the function $\gamma/2$ must be proportional to $A(\gamma+1)$. Since A (nozzle area) is constant for a given installation, this parameter is dropped and the following error in proportionality remains:

$$\frac{\gamma}{2} \neq \gamma + 1 \tag{11}$$

However, for a conventional jet engine, $\gamma$ will have a limited range of approximately 1.33 to 1.38. Thus, the maximum error if $\gamma$ is not accounted for in the system will be approximately 2.2%. However, $\gamma$ may be accounted for by additional instrumentation at a minimum of cost since the gas static temperature may be predicted from the tailpipe total temperature and if the fuel-air ratio at the particular power setting is known. $\gamma$ may be computed and applied as required for precise accuracy if the $\gamma$ range is found to be extensive for a particular propulsion system.

The wire drag loading (D) integrated spanwise across the engine nozzle diameter may be analytically defined as follows:

The wire tensile load P is determined by the equation:

$$P + \frac{\sum_0^1 Wl}{4h} \quad \frac{\sum_0^1 W}{2} \; (\sin\theta)^{-1} \tag{12}$$

Where:

W = the incremental drag load on the wire;
$l$ = the span of the wire;
$h$ = the perpendicular distance (as measured along the longitudinal axis of the nozzle) from the extremity of the nozzle to the line tangent with the wire (see FIG. 2).

The drag load D on the wire is defined as follows:

$$D = C_d \, d_w \, \frac{\pi}{4} \int_0^1 q \, dx + C_d \, d_w \, \bar{q} \, l = Wl \tag{13}$$

Where:

$d_w$ = wire diameter;
$C_d$ = drag coefficient;
$q$ = mean dynamic pressure.

Combining Equations 12 and 13, the wire load P becomes:

$$P = \frac{C_d d_w l^2 \bar{q}}{4h} \tag{14}$$

Since the wire diameter $d$ and wire span $l$ are fixed parameters, the variable parameters in Equation 14 which effectively change the tensile load P of the wire are $q$, $C_d$ and $h$. The parameter $h$ is directly proportional to the slope of the wire as measured at the support means or to the angle $\theta$ (see FIG. 2).

The effect of these parameters (as previously explained) on the system are as follows:

$C_d$ (drag coefficient) of a round wire is a function of the jet Mach number. However, for the proposed installations the jet Mach number M remains at or very near 1.0, and thus $C_d$ remains constant.

$q$ (dynamic pressure) is defined in equation form as:

$$q = \tfrac{1}{2} V^2 \frac{\rho}{g} = \frac{\gamma}{2} P_n M^2 \text{ (reference Equation 5)} \tag{15}$$

$q$ (dynamic pressure) will vary with nozzle exit pressure $P_n$, nozzle exit Mach number and temperature, as a function of $\gamma$. Since a convergent nozzle, for example, will maintain a nozzle exit Mach number of approximately 1.0, the nozzle static pressure $P_n$, will reflect the effective $q$ at nozzle overpresure conditions, thus, integrating the effects of flight speed and altitude, $\gamma$ is the ratio of the specific heat and will reflect a fluid property change with increase in temperature and equivalence ratio. The effective maximum error introduced by $\gamma$ is not expected to exceed 2.2%.

The angle $\theta$ will remain constant due to the use of slope sensing means 35 and the wire adjustment means 19 in one form of my invention or may be sensed or computed in other forms of my invention that will be explained hereinafter.

The load sensing device 17 is a tensile loaded unit that communicates with an indicator which is calibrated linearly at ground test conditions in terms of gross momentum thrusts as previously explained, or with an electrical or pneumatic recording unit also calibrated linearly at ground test conditions.

The wire adjustment means may be electrically or pneumatically controlled in response to signals initiated by the slope sensing means 35.

The wire is preferably circular in cross section to minimize vibrations caused by the gases flowing through the nozzle. The wire size is a function of the span and operating environment; however, a wire diameter of .015 to .075 inch will probably suffice for the most common installations.

By summary I conclude that the "gross momentum thrust" is proportional to the "dynamic pressure" at the throat of a convergent nozzle like that shown schematically in FIG. 1.

$$F_{mv} \alpha q \tag{16}$$

The wire drag D:

$$D = C_d \bar{q} A \tag{17}$$

Where:

$C_d$ = drag coefficient (constant as explained above);
A = wire frontal area (also constant).

Equation 17 becomes by proportionality:

$$D \alpha q \tag{18}$$

Substituting (18) into (16):

$$F_{mv} \alpha D \tag{19}$$

or the gross momentum stream thrust $F_{mv}$ is proportional ($\alpha$) to the drag D of a wire located transversely of the stream of gases flowing through the nozzle.

Gas turbine exhaust jet profiles are characteristically symmetrical and behave as uniform flow fields under flight conditions. Inlet distortion in the gas flow is effectively removed by the settling effect in the low Mach number subsonic combustors. In instances where the gas flow field is not expected to be uniform, however, it will be advantageous to position a plurality of wires transversely across the nozzle, as is illustrated in FIG. 6. The nozzle 55 has a wire 57 extending diametrically there across, such wire being secured in that position by mounting means 59 which in this instance are pulleys like those in FIG. 1.

As in the above embodiment, a load sensing element 61 is secured to one end of wire 57 and to the nozzle. The other end of the wire is connected with wire adjustment means 63. Slope sensing means 65 are connected with the wire and communicate with switch means (not shown) for initiating movements (such as those described in connection with the apparatus of FIG. 1) of wire adjustment means 63.

Hence, the slope of wire 57 may be maintained at a preselected, constant value so that instrumentation means (not shown) may be connected with the load sensing means 61 for detecting variations in the gross momentum thrusts developed by the engine. Two additional wires 67, 69 are positioned to extend transversely across the nozzle exit by mounting means 71, 73 and wire adjustment means 75, 77 are connected to one end of a respective wire. The other ends of wires 67, 69 are connected with load sensing elements (not shown). In addition, instrumentation means (not shown) are connected with each load sensing element so that variations in gross momentum thrusts may be conveniently detected.

The purpose in an arrangement of the type illustrated in FIG. 6 is to detect and average the variations in gross momentum thrusts in nozzles wherein the flow field of the gases is not uniform. Such arrangements will have utility in some instances, although admittedly the flow fields of all present day momentum thrust engines have essentially symmetrical and uniform flow fields.

While momentum thrusts engines which utilize convergent nozzles have been emphasized previously, FIGS. 3 and 4 of the drawing illustrate the application of the invention to momentum thrust engines having convergent-divergent nozzles.

The nozzle 78 has diametrically opposed apertures 79 formed in its throat. A wire 81 is inserted through the apertures, being positioned by mounting means 83 which in this instance are pulleys. Apertures 79 are of a size such that the wire 81 does not engage the peripheral edges of the apertures so that the wire has freedom of movement. As in the other embodiments, the wire is connected with a load sensing element 85 and with wire adjustment means 87 so that the slope of the wire as measured and adjacent its outermost mounting means or pulleys may be maintained at a constant value. Slope sensing means 89 like that of the first described embodiment are provided, and these means communicate with apparatus (not shown) for actuating the wire adjustment means 87 and for transmitting sensed variations in the loading wire to the cockpit and to an indicator which is calibrated in terms of gross momentum thrusts.

As may be best seen in FIG. 4, seal means 91 are provided to seal the aperture 79 against egress of gases therethrough. The seal means 91 may be a flexible, circular sealing element which is secured to the wire 81 adjacent a respective aperture 79. The pressure of the gases flowing through the nozzle will urge the flexible sealing element against the wall of the nozzle, thereby sealing the apertures and preventing the flow of fluid therethrough.

The coefficient of expansion $C_d$ will remain constant so long as the wire 81 extends through the throat of the nozzle, or in other words, at or near the vena contracta of the nozzle. The Mach number is very close to 1.0 at the throat of the nozzle, and thus the apparatus for detecting variations in gross momentum thrusts functions in a manner identical with that described in connection with the convergent nozzles of FIGS. 1 and 6.

The formula for calculating gross momentum thrusts of a momentum thrust engine which utilizes a convergent-divergent nozzle differs from the formula for calculating gross momentum thrusts of engines using convergent nozzles. The differences, however, derive from the effect of having the divergent portion of the nozzle rearwardly of the nozzle throat. This causes differences in the gross momentum thrusts as compared with the thrusts developed by engines with convergent nozzles, but the difference can be easily thrusts as compared with the thrusts developed by engines with convergent nozzles, but the difference can be easily determined and expressed in terms of a percentage of the gross momentum thrust. Thus, my methods and apparatus are applicable whether the momentum thrust engine has a convergent nozzle or a convergent-divergent nozzle.

Referring to Equation 14 above, variations in gross momentum thrust may be determined by detecting variations in the slope of the wire (or angle $\theta$) and the tensile load of the wire.

From Equation 14 the dynamic pressure is:

$$q = \frac{P 4 h}{C_d d_w l^2} \quad (20)$$

$C_d$, $l^2$ and $d_w$ all are constant parameters, as explained above. Thus, by detecting variations in the parameters P (tensile loading on the wire) and $h$ (which is directly proportional to angle $\theta$) of Equation 20 above, the dynamic pressure (which is directly proportional to gross momentum thrust as proved analytically above) may be determined. Gross momentum thrust may be computed by hand, or with a computer, the latter being especially advantageous since the pilot or crew are freed from the task of manually performing a computation while in flight. In addition, variations in parameters P and $h$ above may be detected and fed into a common indicator that will sense variations in gross momentum thrust directly.

FIG. 7 is a schematic illustration of apparatus used to detect variations in the tensile load of a wire 93, and also, variations in tensile load. The sensed tensile load varia-same type shown in FIG. 2 has an arm 97 which communicates with an indicator 99. Hence changes in the angle $\theta$ are detected by the indicator. Wire 93 is connected with a sensing element 101 which may be a strain gage and related apparatus as explained previously that senses variations in tensile load. The sensed tensile load variations are detected by an indicator 103. Knowing the magnitude of the variations in the tensile load of the wire and angle $\theta$ enable computation of the variations in gross momentum thrust (see Equation 20) and explanation above.

A sine wave potentiometer may be used to determine variations in the slope of the wire, while simultaneously a strain gage senses variation in the tensile wire loading. Such variations may be transmitted by a common electrical circuit and amplified to produce direct reading variations in another indicator. These variations may be calibrated in terms of gross momentum thrust.

Where both the tensile load and the angle $\theta$ or slope of the wire are sensed, the method for detecting variations in gross momentum thrusts may be expressed as follows: (a) positioning a wire by means of suitable support members to lie transversely across the stream of gas flow that is directed through the nozzle of the engine; (b) sensing variations in the tensile loading of the wire; and (c) sensing changes in the slope of the wire as measured adjacent at least one of said support members; whereby variations in gross momentum thrusts may be determined.

In FIG. 7-A is illustrated schematically a circuit for determining gross momentum thrust once the slope of the wire adjacent its supports and the tensile loading are determined. The transducer 105 senses a change in tensile loading of the wire and produces an electrical voltage which is an analogue of the loading. The slope sensor 107 generates an electrical analogue of any slope variation from an established norm. The sensor 107 may be a mechanical arm which varies the setting of a potentiometer 109 to produce an electrical voltage proportional to the angular displacement of the arm. The voltage from the transducer 105 and the potentiometer 109 are amplified by the amplifiers 111 and 113, which feed into a summer 115 that adds the voltages and impresses the results on an indicator 117 calibrated in terms of gross momentum thrust.

In FIG. 8 is shown schematically a system for sensing the tensile loading on a wire positioned across the vena contracta of the exhaust gasses. The angle $\theta$ between the wire and its supports is computed by means of an analogue computer to a known reference instead of physically maintaining the angle at a constant. The FIG. 8 apparatus solves the equation $Fg = (a + bt + ct^2)(a^1 + b^1 P + c^1 P^2) P$, where $t$ is the exhaust gas temperature and P is the tensile loading of the wire. The various constants are coefficients determined for each particular type engine. A temperature sensor 119 transmits an electrical analogue of the exhaust temperature $t$ to a multiplier means 121 that doubles the voltage of the analogue to a value $t^2$. The temperature analogue $t$ is also fed into a variable resistor 123 that produces an analogue of the voltage $t$ multiplied by a constant $b$, which is fed into a summer 125. The analogue represented by $t^2$ is fed to a variable resistor 127 that produces an analogue of the voltage $t^2$ multiplied by a constant $c$ also supplied to the summer 125. A voltage which is an analogue of a constant $a$ is fed into the summer 125, the purpose of which is to add the analogues represented by the symbols $a$, $bt$, and $ct^2$.

Simultaneously, a load transducer 129 produces an electrical analogue of the tensile loading P on the wire and feeds this voltage to a multiplier means 131 where the voltage is squared to P² to a variable resistor 133 which produces an analogue of the value $c^1P^2$. The voltage from the load transducer is fed to a variable resistor 137 which produces an analogue of the value $b^1P$. Also, a voltage which is an analogue of a constant $a^1$ is fed into a summer 135, the purpose of which is to add the analogues represented by the symbols $a^1$, $b^1P$, and $c^1P^2$.

The outputs of summers 125 and 135 are fed to a multiplier means 139, along with an analogue of the wire loading P to produce an analogue corresponding to the gross momentum thrust Fg in accordance with the above equation. A calibration unit 141 which may contain the variable resistor 141 is used such that a calibrated reading of gross, thrust, as corrected for a constant slope of selected value, is produced.

While the above descriptions have been made with reference to various electrical devices for sensing changes in parameters, the same results may be obtained with equivalent nonelectrical devices, such as hydraulic or pneumatic devices.

The sensing devices and transmitting and indicating devices broadly referred to above are given by way of example, all being known to those of average skill in the art. My invention does not relate to the means for transmitting the sensed variations in parameters. There are numerous known ways to transmit such data; my contribution to the art concerns the matter of what should be sensed, as explained in detail above.

An example of the size and configuration of a suitable wire to position across the stream of gas that is directed through the nozzle of the engine was previously given. It should be understood that the wire should have aerodynamic stability to eliminate vibrations. A wire of circular cross section has been found satisfactory in this regard. This is an important practical consideration but other shapes of wire are within the scope of my invention. Also, my invention is not restricted to the use of metal wires, but includes all materials which have characteristics suitable for the above described applications. Moreover, it is not essential that the wire be stretched diametrically across the nozzle throat, and the term "transversely," when used to described the position of the wire, does not limit wire placement to an exact diametrical position.

It should be apparent from the foregoing that I have provided an invention having significant advantages.

The above disclosed methods for detecting variations in a gross momentum thrust developed by momentum thrust engines has surprising simplicity even though the problem has been considered to be one involving troublesome complexities. The use of a wire stretched transversely across the nozzle is advantageous, particularly in view of its simplicity. There is little likelihood of any mechanical failure short of an actual rupture of the wire, and therefore my methods and apparatus will function with essentially failsafe reliability. The various mechanical or electrical components necessary to achieve the desired results are all reliable devices which can be expected to offer no difficulties during operation. Also, the use of a wire for detecting variations in gross momentum thrusts is advantageous since the wire does not significantly decrease the thrusts developed by the engine due to the small diameter of the wire. The accuracy which may be achieved by the use of the foregoing methods and apparatus for detecting variations in gross momentum thrusts can be outstanding. Therefore, pilots can conveniently know the thrusts developed by inflight, momentum thrust engines; can readily detect any variation from preselected thrusts; can easily equalize the thrust developed by respective engines; and can conveniently have means for maximizing the range of aircraft.

While I have shown my invention in only a few forms, it will be obvious to those skilled in the art that it is not so limited, but is susceptible of various changes and modifications without departing from the spirit thereof.

I claim:
1. A method for detecting variations in the gross momentum thrust of a momentum thrust engine, said method comprising the steps of:
   positioning a wire transversely across the region of the vena contracta of the exhaust flow of the nozzle of the engine; and
   sensing variations in the tensile loading of the wire, said variations resulting from variations in the dynamic pressure of the gas and thus the gross momentum thrust developed by the engine.

2. A method for detecting variations in the gross momentum thrust of a momentum thrust engine, said method comprising the steps of:
   positioning a wire by means of suitable support members to lie transversely across the stream of gas flow that is directed through the nozzle of the engine;
   sensing changes in the slope of the wire as measured adjacent at least one of said support members;
   adjusting the tension of the wire in response to the sensed changes in the slope of the wire to reestablish and maintain said slope at a constant value; and
   sensing variations in the tensile loading of the wire.

3. The method defined by claim 2 in which the wire is placed across the region of the vena contracta.

4. A method for detecting variations in the gross momentum thrust of a momentum thrust engine, said method comprising the steps of:
   positioning a wire by means of suitable support members to lie transversely across the stream of gas flow that is directed through the nozzle of the engine;
   sensing variations in the tensile loading of the wire;
   sensing changes in the slope of the wire as measured adjacent at least one of said support members;
   whereby variations in gross momentum thrusts may be determined;
   converting the sensed variations in the tensile loading and the slope into electrical analogues;
   accumulating said electrical analogues to produce an analogue proportional to changes in gross momentum thrust.

5. The method defined by claim 4 in which the wire is placed across the region of the vena contracta.

6. Apparatus for detecting variations in the gross momentum thrust of a momentum thrust engine, said apparatus comprising:
   a wire positioned transversely across the gas flow directed through the nozzle of the engine;
   mounting means secured to the nozzle for supporting and maintaining the slope of said wire in its established position; and
   a sensing element connected with said wire for sensing variations in the tensile loading of the wire, said variations resulting from changes in the dynamic pressure of the gas and thus the gross momentum thrust developed by the engine.

7. The apparatus defined by claim 6 in which the wire is placed across the region of the vena contracta.

8. Apparatus for detecting variations in the gross momentum thrust of a momentum thrust engine, said apparatus comprising:
   a wire positioned transversely across the gas flow directed through the nozzle of the engine;
   mounting means secured to the nozzle for supporting and maintaining said wire in its established position;
   sensing means connected with the wire for sensing changes in the slope of the wire in the vicinity of the mounting means;
   wire adjustment means connected with said wire for adjusting the slope of the wire in response to sensed changes in slope to reestablish and maintain said slope at a constant value; and
   a sensing element connected with said wire for sensing variations in the tensile loading of the wire, said variations resulting from changes in the dynamic pressure of the gas and thus the gross momentum thrust developed by the engine.

9. The apparatus defined by claim 8 in which the wire is placed across the region of the vena contracta.

10. Apparatus for detecting variations in the gross momentum thrust of a momentum thrust engine, said apparatus comprising:
    a wire positioned transversely across the gas flow directed through the nozzle of the engine;
    mounting means secured to the nozzle for supporting and maintaining said wire in its established position;
    sensing means connected with the wire for sensing changes in the slope of the wire in the vicinity of the mounting means; and
    a sensing element connected with said wire for sensing variations in the tensile loading of the wire; whereby variations in gross momentum thrusts may be determined.

11. The apparatus defined by claim 10 in which the wire is placed across the region of the vena contracta.

12. Apparatus for detecting variations in the gross momentum thrust of a momentum thrust engine, said apparatus comprising:
    a wire positioned transversely across the throat region of the nozzle of a momentum thrust engine;
    mounting means secured to the nozzle adjacent its throat region for supporting the wire;
    a sensing arm connected with the wire adjacent the mounting means to move responsive to changes in the slope of the wire;
    a switch actuated by the sensing arm and having an open position established when the slope of the wire and hence the arm are in a selected position, and closed positions on each side of the open position;
    a power source connected with said switch;
    a motor driven by the power source in a forward or reverse direction responsive to selected closed positions of the switch;
    tension adjustment means connected with the motor and with the wire to maintain a predetermined position of the sensing arm and a predetermined slope of the wire adjacent its mounting means; and
    a sensing element communicating with the wire to sense variations in its tensile loading.

13. The apparatus defined by claim 12 in which the wire is placed across the region of the vena contracta.

14. The apparatus defined by claim 12 wherein said tension adjustment means is a screw jack.

15. The apparatus defined by claim 14 in which the wire is placed across the region of the vena contracta.

16. A method of detecting variations in gross momentum thrust of momentum thrust engines, said method comprising:
    positioning a wire to lie transversely across the vena contracta of the exhaust gasses of the engine;
    sensing changes in the tensile loading of the wire;
    sensing changes in the temperature of the exhaust gasses;
    converting said sensed changes in loading and temperature into electrical analogues;
    multiplying the electrical analogues times selected constants and each other in an analogue computer system to correct slope changes in the wire adjacent its supports to a predetermined value.

References Cited

UNITED STATES PATENTS 2,647,403 8/1953 Fenske _____ 73—228
3,114,261 12/1963 Dillon et al. _____ 73—228

JERRY W. MYRACLE, Primary Examiner

U.S. Cl. X.R.

73—228